United States Patent
Kittson et al.

(10) Patent No.: US 6,235,136 B1
(45) Date of Patent: *May 22, 2001

(54) WATER-RESISTANT MASTIC MEMBRANE

(75) Inventors: Mark Kittson, Niagara Falls; Darryl Williams, Mississauga, both of (CA)

(73) Assignee: Saint-Gobain Technical Fabrics Canada, Ltd. (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,403

(22) Filed: Jul. 23, 1997

Related U.S. Application Data

(62) Division of application No. 08/669,167, filed on Jun. 24, 1996, now abandoned.

(51) Int. Cl.[7] .............................. B32B 31/00; D04H 3/16
(52) U.S. Cl. ......................................... 156/166; 427/207.1
(58) Field of Search ........................ 427/207.1; 156/166

(56) References Cited

U.S. PATENT DOCUMENTS

| | | | |
|---|---|---|---|
| 3,967,032 | 6/1976 | Plotz | 428/300 |
| 4,151,025 | 4/1979 | Jacobs | 156/71 |
| 4,386,981 | 6/1983 | Clapperton | 156/71 |
| 4,588,458 | 5/1986 | Previsani | 156/71 |
| 4,599,258 | 7/1986 | Hageman | 428/140 |
| 5,439,540 | 8/1985 | Lippman et al. | 156/71 |
| 5,456,785 | 10/1995 | Venable | 156/229 |

OTHER PUBLICATIONS

Grace Masonry Products "The System Solution to Complete Moisture Protection in Masonry Walls," W.P. Grace & Co. (1994).

*Primary Examiner*—Blaine Copenheaver
*Assistant Examiner*—Arti R. Singh
(74) *Attorney, Agent, or Firm*—Duane Morris & Heckscher LLP

(57) ABSTRACT

This invention provides reinforced, water-resistant membranes, and methods of manufacturing and installing such membranes. These membranes include a mastic layer having first and second major surfaces and a fiber-containing reinforcing layer disposed within the mastic layer for improving the mechanical strength of the membrane. The membrane can be bonded to an underlying substrate by the application of heat or pressure to form an adherent bond. The reinforced membrane of this invention can have a tensile strength of at least about 300 psi or more.

5 Claims, 2 Drawing Sheets

Figure 4:
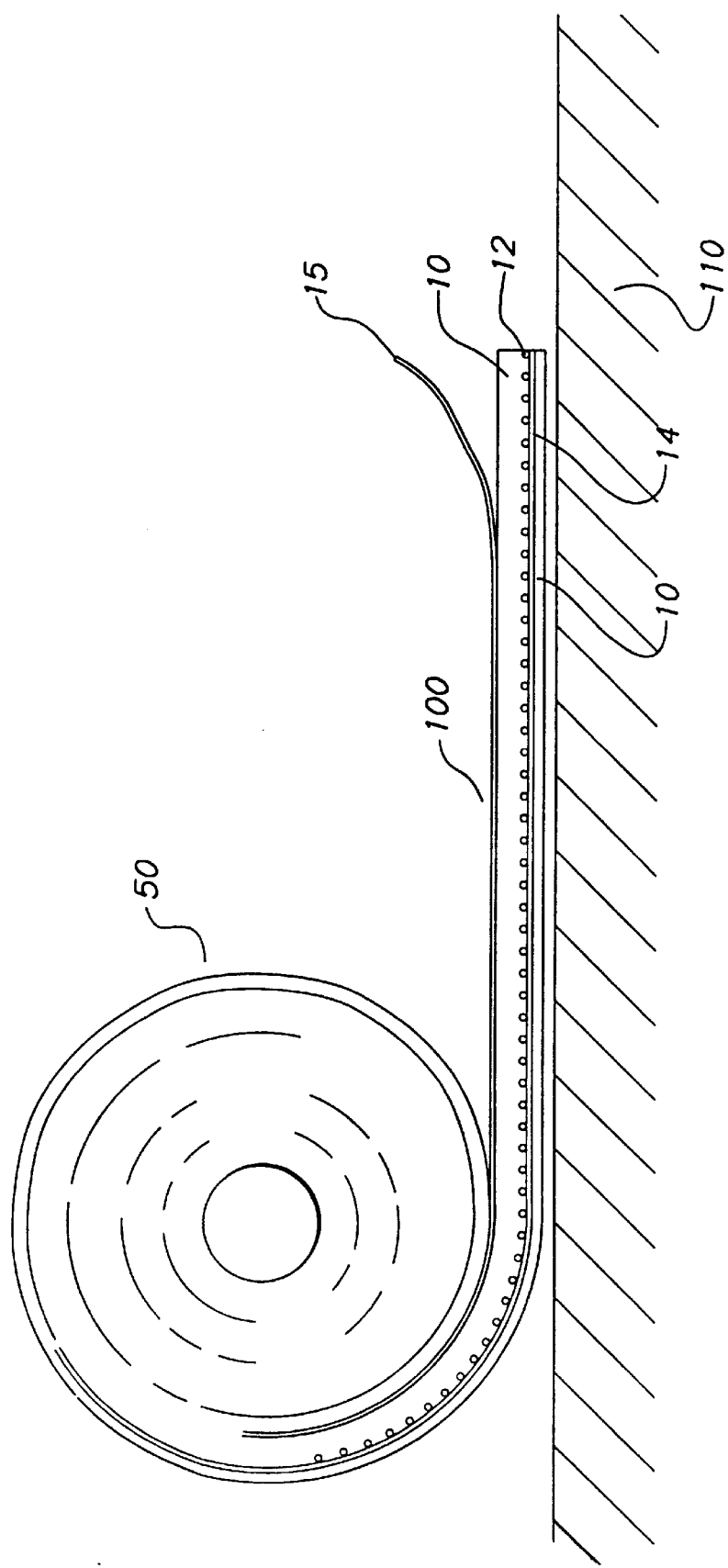

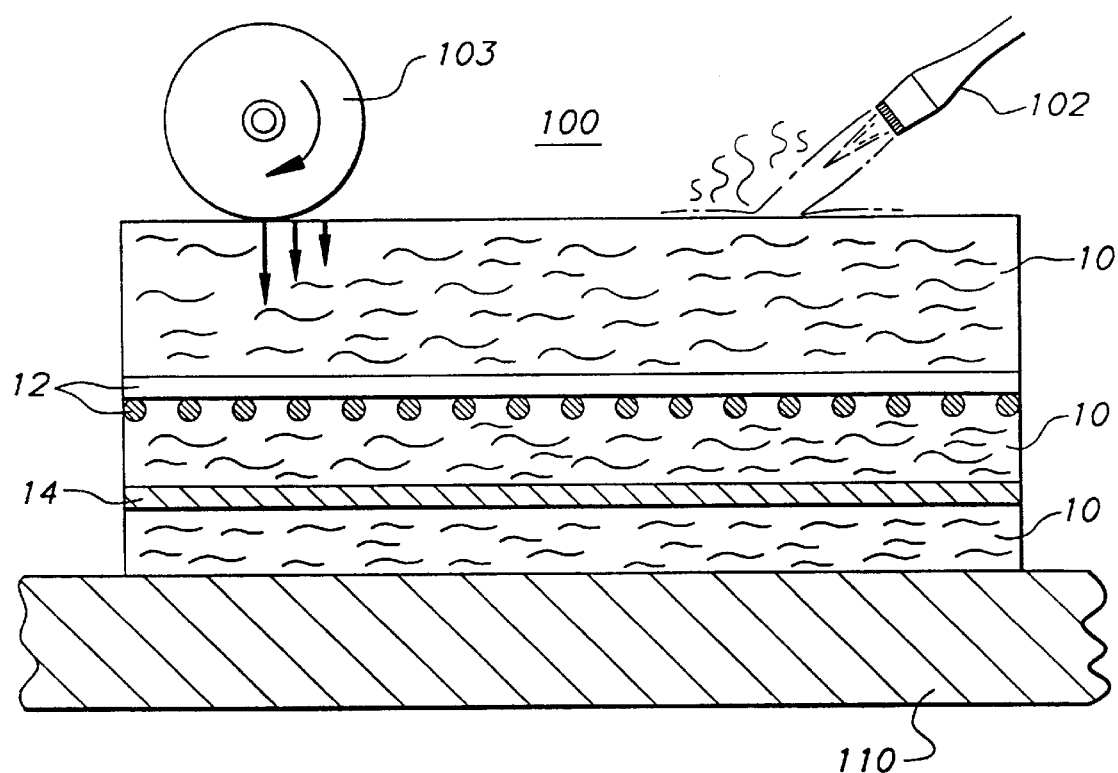
FIG. 1
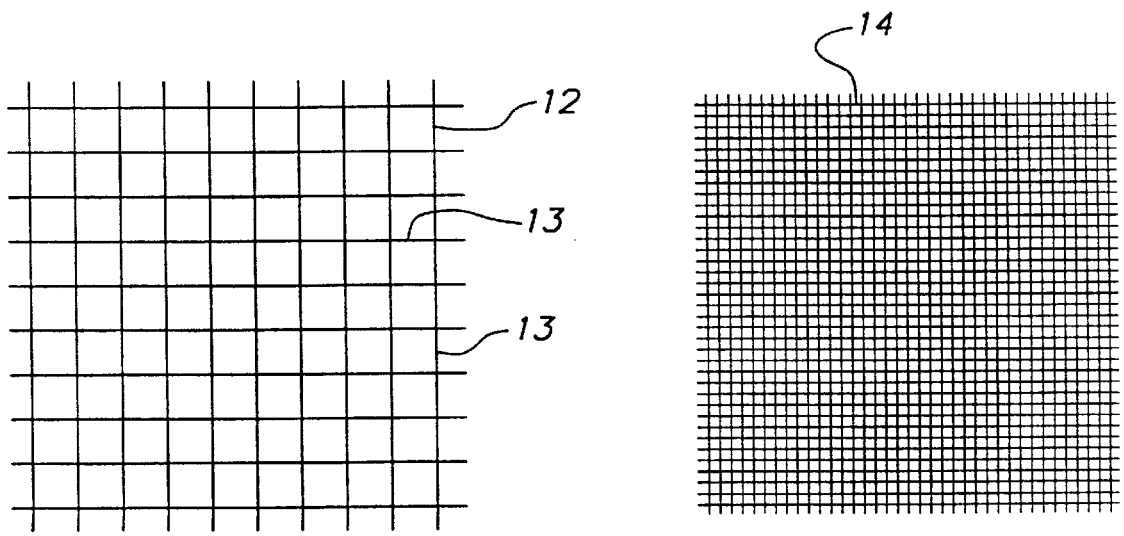
FIG. 2
FIG. 3

WATER-RESISTANT MASTIC MEMBRANE

RELATED APPLICATIONS

This invention is a divisional of U.S. patent application Ser. No. 08/669,167, filed Jun. 24, 1996, now abandoned.

FIELD OF THE INVENTION

This invention relates to reinforced, water-resistant membranes used in water-proofing applications, and more particularly, to reinforced mastic weather-proofing systems.

BACKGROUND OF THE INVENTION

Many outdoor surfacing applications have employed asphalt for its weather resistance and superior mechanical properties under heavy loads. Asphalt is a dark cementitious material composed predominantly of bitumens. Most asphalts are now produced from the refining of petroleum and are used primarily in paving and roofing applications. At normal service temperatures asphalt is viscoelastic; at higher temperatures, it becomes viscous.

The water resistance of asphalt layers is essential to its durability. Asphalts that have a low content of soluble salts show a low water absorption. When asphalt picks up water, it softens and blisters. Bacteria and fungi are also known to attack the very low molecular weight portion of bituminous materials. Exposed asphalt films have, additionally, been known to harden and crack when exposed to ultraviolet radiation.

Asphalt-mastics are known to include mineral fillers which are added to influence their flow properties and reduce costs. Mineral-filled films show proven resistance to flow at elevated temperatures, improved impact resistance and better flame-spread resistance. Fillers may also increase the water absorption of asphalt, and can include ground limestone, slate flowers, finely divided silica, trapped rocks, and mica. Opaque fillers offer protection from weathering, and asbestos filler, because of its fibrous structure can be added to improve toughness. Asbestos fibers have also been added to asphalt paving mixes to increase the resistance to movement under traffic, and in roofing materials, for fire-retardant purposes.

Numerous asphalt-based membranes have been produced for smaller surface-area applications, such as in the patching of roads and roofs. Such membranes can be non-reinforced, or lightly reinforced and are known to have pressure sensitive characteristics. One example of a commercial membrane product, Road Glass from Owens-Corning Fiberglass, provides a membrane capable of accepting an embedded reinforcement at the job site. The Road Glass system involves melting asphalt-based mastic onto the targeted surface, followed by the application of a fiberglass layer, and then, an additional layer of asphalt mastic is provided to produce a composite membrane.

SUMMARY OF THE INVENTION

Reinforced water-resistant membranes are provided by this invention which include a laminated substrate, including a mastic layer adhered to a carrier layer and containing a fiber-containing reinforcement layer disposed within the mastic layer for increasing its mechanical properties. The membrane is capable of being bonded to an underlying substrate by applying heat or pressure to bond the mastic layer to the substrate.

In a preferred embodiment of this invention, a membrane is provided which includes a rubberized asphalt mastic layer reinforced with an open-mesh, glass-fiber reinforcement. A fabric carrier layer is located beneath a first major surface of the mastic layer for enabling the complete filling of the glass-fiber reinforcement layer by the mastic material. This membrane can be provided in roll form and can be bonded either by heat or pressure to an underlying substrate. The membrane of this embodiment has extremely favorable mechanical properties due to the fiberglass reinforcement mesh, including a tensile strength of at least about 300 psi. This membrane can be applied without a tack coat and is relatively easy to install.

A BRIEF DESCRIPTION OF THE DRAWINGS

The accompanying drawings illustrate embodiments of the invention according to the practical applications of the principals thereof, and in which:

FIG. 1: is a diagrammatic side view of the application of a preferred water-resistant membrane of this invention to a substrate;

FIG. 2: is a top plan view of a glass fiber-reinforcement layer for the preferred membrane of this invention;

FIG. 3: is a top plan view of a preferred fabric carrier layer for the water-resistant membrane of this invention; and FIG. 4: is a diagrammatic side view of a roll configuration for the water-resistant membrane of this invention.

DETAILED DESCRIPTION OF THE INVENTION

Water-resistant membranes, and methods of manufacturing and installing such membranes are provided by this invention. The mastic-based laminates disclosed herein are useful for many applications requiring water-resistance and durability. Such applications include road surfacing, roofing, bridge decking and metal coating. The reinforced membranes of this invention include a tensile strength of at least about 300 psi and up to about 500–600 psi in the most preferred embodiments. This is significantly above most commercial surface patching laminates which are known to have a tensile strength of only about 250–300 psi. The overall thickness of the membranes of this invention is less than 250 millimeters, and preferably about 50–150 millimeters.

With reference to the figures, and in particular, to FIG. 1 thereof, there is shown a preferred water-resistant membrane 100 having a distinct number of layers for providing different functions and properties. The largest constituent is preferably the mastic layer 10, which, in a first preferred embodiment, is located on both major surfaces of the membrane 100. The mastic layer 10 of the membrane 100 further includes a carrier layer 14 and a reinforcing layer 12. The reinforcing layer 12 assists in improving the mechanical properties of the membrane, whereby the carrier layer 14 is designed to assist in the preparation of the membrane and can, but may not necessarily, contribute to improved mechanical performance.

The mastic layer of this invention preferably contains a bituminous preparation having adhesive or sealing properties. The preferred mastic material is asphalt-based. Petroleum-derived asphalt, which represents nearly all of the total asphalt products sold in the United States can be manufactured by a number of popular methods, including straight reduction from crude oil, air-blowing from asphalt stock or flux, propane diasphalting from residuum stock, asphalt derived from a thermal cracking process, blended asphalts and asphalt emulsions containing disbursed immiscible liquids.

The asphalt mastic of this invention can also contain various additives for improving its hardness and durability, including clays, casein gelatine, or blood albumin as peptizing agents. Other preferred additives for the mastic layer 10 are natural or synthetic rubber additives. The preferred rubber materials are capable of recovering substantially in shape and size after removal of a deforming force. Both thermoplastic elastomers and thermosetting rubbers can be used. Suitable synthetic rubbers may include, for example, urethanes, styrenics, olefinics, copolyesters, silicones, elastomeric alloys, polyamides, melt processable rubbers, natural rubber, neoprene, nitrile, chloroprene, styrene, butadiene, styrene butadiene, and recycled rubber, such as chopped up tires. Specific candidates include SBS, SIS, SEBS or PP types. Such rubbers can also include reinforcing agents, fillers, softeners, extenders and vulcanization agents, plasticizers and auxiliary materials.

The preferred reinforcing layer 12 of this invention includes a scrim or grid. It desirably includes an open mesh, bi-axially oriented, knit fiber fabric having a tensile strength of at least about 250 psi, and preferably greater than 300–500 psi. The grid or scrim desirably has an open pores of about 0.25–0.5 inches in cross-section and is thermally stable to at least 400° F. In the preferred embodiment, the fabric is made of a woven or non-woven series of glass fibers reinforced with a resinous adhesive. Alternative fibers can include, for example, polyester, rayon, or combinations of polyester and rayon with glass fibers. Various deniers and scrim patterns can be used so long as patterns provide a sufficient mechanical strength to the resulting membrane 100 and are easily penetrated by molten mastic.

The preferred carrier layer 14 of this invention comprises a woven or non-woven fabric having relatively small pores. It is thermally resistant to at least 400° F. and provides a backing layer during the impregnation of the reinforcing layer 12 by the mastic. Once the reinforcing layer 12 has been impregnated and encapsulated in a mastic 10, the carrier layer 14 can be destroyed, or melted, by the molten mastic material, since it is designed to provide only limited performance to the resulting membrane 100. In the preferred embodiment, however, the carrier layer 14 is embedded between the reinforcing layer 12 and a second major surface of the membrane 100.

The membranes of this invention can be provided in flat or roll form, or in individual packages. One or both major surfaces can be provided with a tack-killer material, such as fine silica aggregate of about 1 micron to about 3 millimeters in diameter, or a woven or non-woven mat. Alternatively, a release liner 15 can be provided on at least one surface for permitting the membrane to be rolled into itself for convenient transport.

The membranes of this invention can be manufactured by many processes, including spraying asphalt emulsion onto the reinforcing and carrier layers 12 and 13, or by dipping these layers through a molten mastic tank having a temperature of about 400°–420° F. In either process, the reinforcing and carrier layers 12 and 14 can be unwound from a pair of rolls with the carrier layer forming the lower most surface of the laminate prior to applying the mastic material. A knife-over-roll coater can be provided following the application of the mastic to define a gauge of about 50–150 millimeters, and more preferably, about 120 millimeters in thickness. The resulting coated web can be dried at ambient temperature or sent through a drying oven prior to cutting and rolling the mastic into a convenient form, such as a roll or patch. A release liner 15 can be applied to one face and sand or powder silica applied to the opposite face prior to rolling.

The membrane 100 of this invention can be applied using heat, pressure, or both to any substrate surface 110. In a preferred embodiment, the membrane 100 is applied to a substrate by removing the release liner 15 and applying the lower major surface of the mastic layer 10 to the substrate surface 110. Pressure, heat, or both are then applied to the top tack-killer surface and the membrane is compressed to form an adherent bond with the substrate 110. The flame applicator 102 or roll applicator 103 can be used for this purpose.

From the foregoing, it can be realized that this invention provides an improved membrane and methods for manufacturing and applying such membranes to substrate surfaces.

Although various embodiments have been illustrated, this is for the purpose of describing, but not limiting, the invention. Various modifications, which will become apparent to one skilled in the art are within the scope of this invention described in the attached claims.

What is claimed is:

1. A method of making a reinforced, water-resistant membrane comprising:
   (a) providing a substrate;
   (b) applying a first mastic coating directly on a first major surface of said substrate; and
   (c) adhering a porous, glass fiber-containing reinforcing layer directly on a second major surface of said substrate, said second major surface disposed opposite said first major surface, said reinforcing layer containing a resinous adhesive,
   wherein the substrate, the first mastic coating and the reinforcing layer comprise directly contiguous layers.

2. A method of making a reinforced, water-resistant membrane comprising:
   (a) providing a substrate;
   (b) applying a first mastic coating on a first major surface of said substrate;
   (c) adhering a porous, glass fiber-containing reinforcing layer on a second major surface of said substrate, said second major surface disposed opposite said first major surface, said reinforcing layer containing a resinous adhesive; and,
   (d) applying a tack-resistant layer on a first major surface of the membrane.

3. The method of claim 2, wherein said tack-resistant layer comprises a fine aggregate.

4. The method of claim 1, comprising the further step of:
   applying a second mastic coating over the reinforcing layer.

5. The method of claim 4, comprising the further step of:
   applying a tack-resistant layer on a first major surface of the second mastic coating.

* * * * *